UNITED STATES PATENT OFFICE.

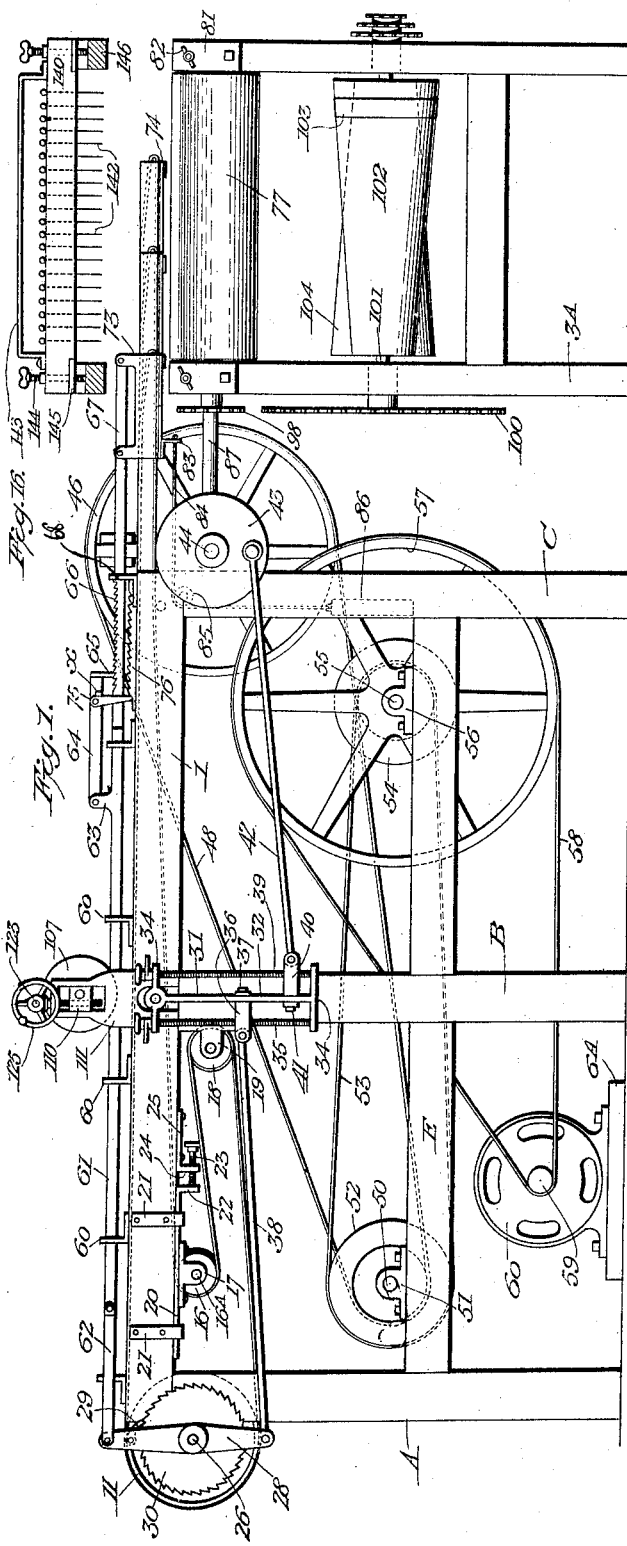

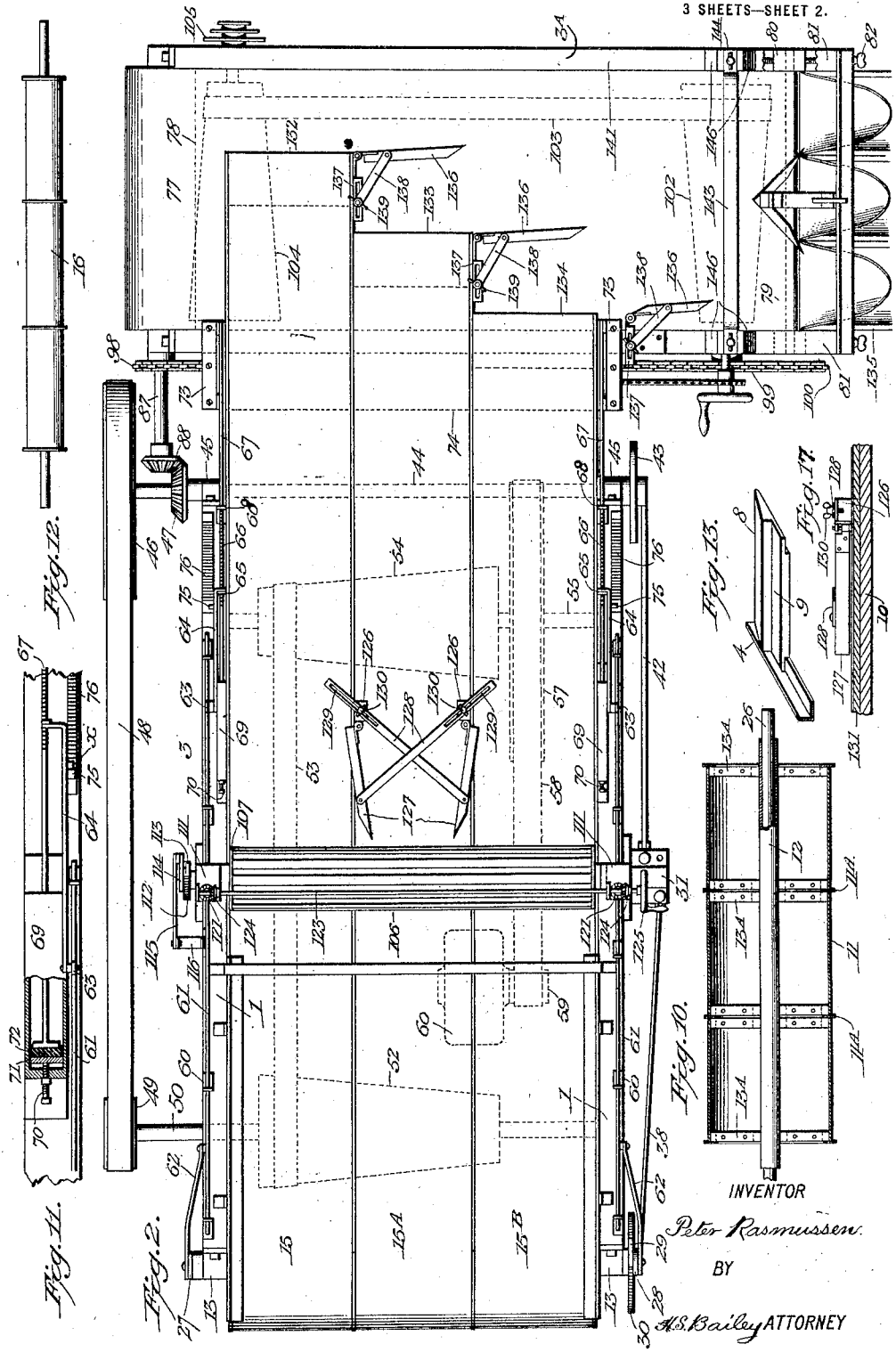

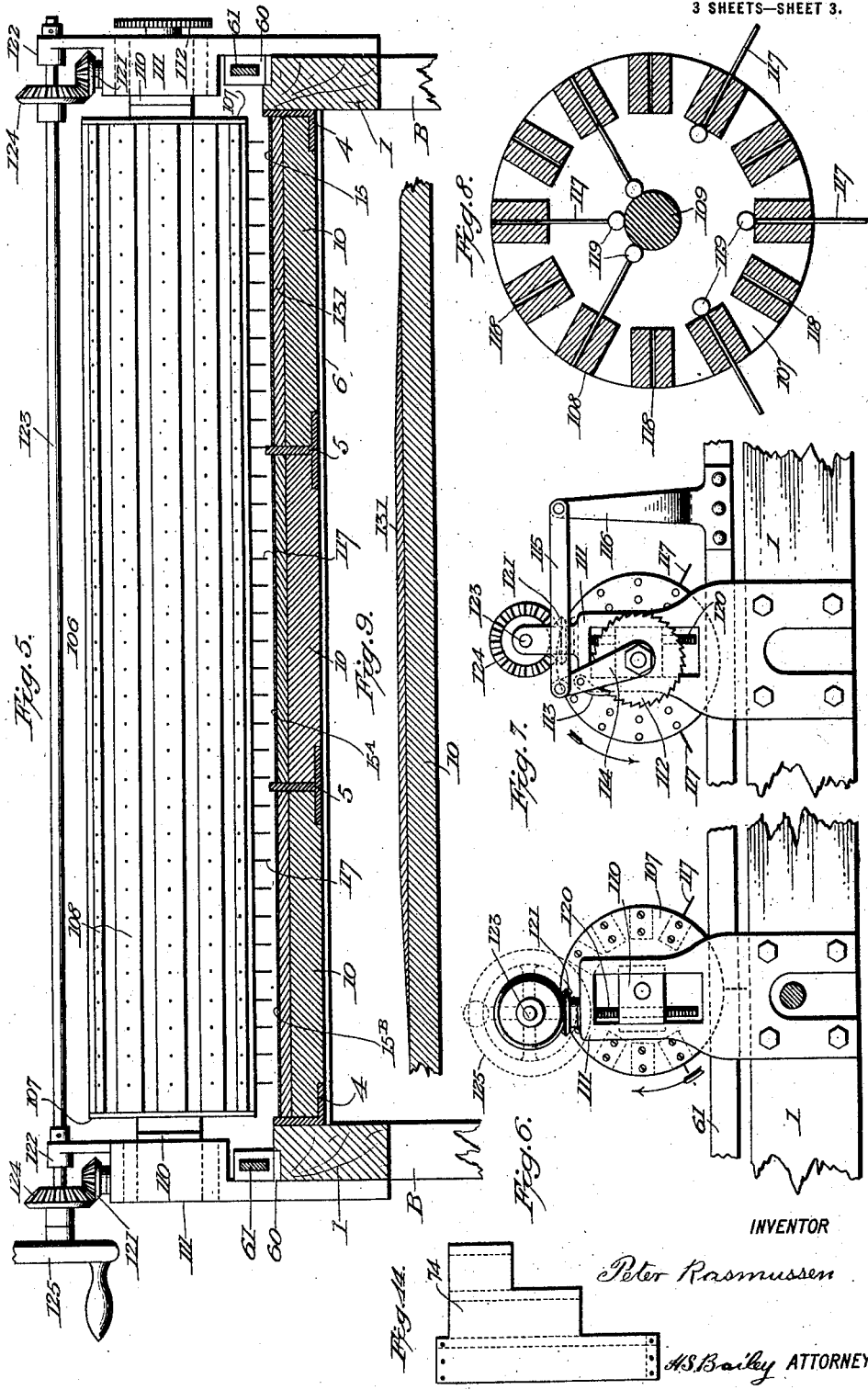

PETER RASMUSSEN, OF DENVER, COLORADO, ASSIGNOR OF ONE-HALF TO STEPHEN KNIGHT, OF DENVER, COLORADO.

AUTOMATICALLY-OPERATING CAKE RECEIVING, SEPARATING, DIVIDING, AND CENTRALIZING MACHINE.

1,397,655.  Specification of Letters Patent.  Patented Nov. 22, 1921.

Application filed August 30, 1920. Serial No. 406,928.

*To all whom it may concern:*

Be it known that I, PETER RASMUSSEN, a citizen of the United States of America, residing at the city and county of Denver and State of Colorado, have invented a new and useful Automatically-Operating Cake Receiving, Separating, Dividing, and Centralizing Machine, of which the following is a specification.

My invention relates to a new automatically operating cake receiving, separating, dividing and centralizing machine.

And the objects of my invention are:

First: To provide a cake receiving and forwardly feeding and discharging machine that separates, divides, centralizes and again separates the cakes, and then discharges them into a cake stacking device.

Second: To provide an easily operated practical cake separating and dividing machine that handles the cakes without breaking them. And Third: To provide an automatically operating machine that will rapidly arrange and discharge cakes in proper order to be stacked by automatically operating stacking machines.

I attain these objects by the mechanism illustrated in the accompanying drawings, in which:

Figure 1 is a side elevation of the main conveyer and its supporting frame, together with the alining conveyer at the discharge end thereof, and showing the operating mechanism for said conveyers.

Fig. 2 is a plan view of the conveyers and operating mechanism shown in Fig. 1.

Fig. 3 is a plan view, on a slightly reduced scale, of the table supporting frame for the main conveyer.

Fig. 4 is a vertical transverse sectional view of the power operated drum which operates the three-part main conveyer, and around which the said parts of the conveyer pass.

Fig. 5 is a transverse, sectional view through the main conveyer frame, showing the drum for separating overlapping cakes as they move forward on the three-part conveyer.

Fig. 6 is an end view of one end of the drum shown in Fig. 5, together with one of the supporting brackets, and means for effecting vertical adjustment of the drum.

Fig. 7 is a view of the opposite end of the drum from that shown in Fig. 6, also illustrating the pawl and ratchet mechanism by which the drum is rotated.

Fig. 8 is an enlarged, transverse sectional view through the drum.

Fig. 9 is a longitudinal, sectional view through one of the boards constituting one of the three table members, showing a raised portion thereon, which is located beneath the cake separating drum.

Fig. 10 is a longitudinal sectional view of the conveyer-turning and supporting drum shown in Fig. 4.

Fig. 11 is a sectional plan view of the mechanism for moving the receiving plate forward over the second conveyer, and for cushioning the quick return of the same.

Fig. 12 is a side view of one of the rollers around which the under laps of the three-part main conveyer pass.

Fig. 13 is a perspective view of one of the castings which terminate the discharge ends of the three boards which make up the main conveyer table.

Fig. 14 is a plan view of the quick return plate which receives the goods from the main table and deposits them on the second table.

Fig. 15 is a horizontal sectional view through the variable-throw rock lever. And Fig. 16 is a front view of the cake separator at the discharge end of the second conveying machine.

Fig. 17 is a fragmental sectional view through the table, showing one of the cake dividers in side elevation.

Similar letters of reference refer to similar parts through out the several views.

Referring to the drawings:

The numeral 1 indicates the side bars, and A, B and C the legs of the main supporting frame 3, of the cake and cracker, separating, distributing and discharging machine, which, while it may be constructed wholly of metal, I preferably construct of wood and metal.

My present invention embodies a number of improvements that I have made in my Patent Number 1,217,345, issued to me on February 27, 1917, for an automatic stacking machine for cakes, crackers and other articles, the present invention being a divisional part of that patented machine, with perfected improvements, the said improvements having been recently completed and placed in practical operation.

The upper side bars 1, of the main conveyer frame 3, support a table frame which comprises outside angle bars 4, which are secured to the inner sides of the side bars 1 and two intermediate T bars 5, the said bars 4 and 5 being connected at intermediate points by strap irons 6. The angle bar 4, on the far side of the table and the adjoining T bar are of the same length, the next T bar being substantially seven inches shorter, while the remaining angle bar is substantially seven inches shorter than the second T bar. A casting 7, of the form shown in Fig. 13, is secured upon the horizontal flange of the longest angle bar 4, and that of the adjoining T bar 5, at their forward ends; a second casting 7ᴬ, connects the longer T iron with the end of the shorter T iron, while a like casting 7ᴮ, connects the latter T iron with the shorter angle iron 4; this arrangement giving a stepped forward end to the table frame, as will be understood by reference to Fig. 3. The inner flange of the longer T bar 5, is cut off, beyond the casting 7ᴬ, and the outer flange of the shorter T bar is cut off beyond the casting 7ᴮ.

Each of the castings 7, 7ᴬ and 7ᴮ, comprises a nose portion 8, around which the discharge end of the main conveyer passes, as will be presently described, and a step portion 9, upon which rest the forward ends of boards 10, which constitute a supporting table for the said conveyer. This table extends back nearly to the forward end of the frame, and is supported on the strap irons 6.

Upon the upright standards or legs A, at the forward end of the frame I mount a three-part drum 11, upon a hollow shaft 12, which is mounted at its opposite ends in bearings 13, which are bolted to said legs. This drum preferably comprises ring-shaped supports 13ᴬ, which may be made up of semi-circular members which are bolted together and rigidly secured upon the hollow shaft 12, and sheet metal cylinders 14, which are slipped upon and secured to said supports.

By reference to Fig. 10 it will be seen that the drum 11, is made in three sections, which are separated by flat rings 11ᴬ, which may be secured either to the ends of the central section, or to the inner ends of the two outer sections, and these rings are of slightly greater diameter than the drum's sections, and thus form annular flanges which define the three sections of the drum, which move in unison.

The surface of each cylinder 14, is roughened preferably by forming in the same, numerous perforations which are punched through from the inner surface of the cylinder, but any other method of roughening the surfaces may be employed.

Endless canvas conveyers 15, 15ᴬ and 15ᴮ, pass around this drum, their upper laps resting upon the table 10, and passing over the noses 8, of the castings 7, at the forward end of the table. From the noses 8, the conveyers pass over and around a roller 16, on a shaft 16ᴬ, which is mounted in adjustable bearings 17, on the under side of the side rails of the frame, and thence forward a short distance and around a roller 18, mounted in bearings 19, which are secured to the middle uprights or legs B of the frame, and thence to the drum 11.

The bearings 17, are secured to metal strips 20, which are slidably mounted in guides 21, which are secured to the side bars. The strips 20, have depending abutment lugs 22, against which bear the ends of hand screws 23, which are supported in threaded lugs 24, on strips 25, which are rigidly secured to the under side of the side bars of the frame. Thus by turning the hand screws the conveyers may be given the desired tension or tightness, and are held at this tension by the engagement of the ends of the hand screws 23, with the lugs 22, of the slidable strips 20, to which the bearings of the belt tightening roller 16, are secured.

A solid shaft 26, passes loosely through the hollow shaft 12, and upon the ends of the shaft 26, are rigidly secured arms 27 and 28. The arm 28 is secured midway of its length to the said shaft 26, and near its upper end is mounted a gravity pawl 29, which engages the teeth of a ratchet wheel 30, which is rigidly mounted on the adjacent end of the hollow shaft 12. A vertically disposed, variable throw rock lever 31, is pivotally secured at its upper end to the side rail 1, of the frame 3; this rock lever comprises a flat vertical plate 32, having two or more vertical slots 33, the plate terminating at its opposite ends in T-flanges 34, having alined holes opposite the slots 33, the holes being arranged in opposite rows as clearly shown in Fig. 2.

A hand screw 35, is mounted in a pair of the alined holes on the side of the lever 31, facing the arm 28, and upon this screw is mounted a block 36, the inner end of which is slidably mounted in the adjacent slot 33, of the plate 32, the block being held in its slot by a cap 37, which is bolted to the block and bears against the plate. To this block is pivotally secured one end of a connecting rod 38, the opposite end of which is pivotally secured to the lower end of the arm 28. A hand screw 39, similar to the hand screw 35, is mounted upon the opposite side of the rock lever 31, but out of line with the said hand screw 35, and upon this screw 39, is mounted a threaded block 40, similar to the block 36, the inner end of which enters the adjacent guide slot 33, and is held in sliding engagement therewith by a cap 41.

To the block 39, is pivotally secured one end of a connecting rod 42, the opposite end of which is pivotally connected to a crank wheel 43, which is rigidly mounted on one end of a shaft 44, which is mounted in bearings 45, on the rear standards or legs C of the frame.

Upon the opposite end of the shaft 44, is rigidly mounted a belt wheel 46, and a bevel pinion 47 is also rigidly mounted on this shaft between the belt wheel 46, and the adjacent side bar of the frame. A belt 48, passes around the wheel 46, and thence around a pulley 49, on a shaft 50, which is mounted in bearings 51, adjacent the forward end of the frame, which extend between the front and rear legs, a suitable distance below the side bars 4. The shaft 50, carries a cone pulley 52, which is connected by a belt 53, with a similar cone pulley 54, on a shaft 55, which is mounted in bearings 56, on the bars E, adjacent the rear end of the frame. The shaft 55, also carries a belt wheel 57, which is connected by a belt 58, with a pulley 59, on the shaft of an electric motor 60, as shown, or with any other suitable power source, the motor being secured upon a base 6A, which is secured to the floor. It will thus be seen that power from the motor is transmitted through the belt 53, and wheel 57, to shaft 55, and pulley 54, thence by belt 53, and pulley 52, to shaft 50, and thence by pulley 49, belt 48, wheel 46 and shaft 44, to the crank wheel 43, which reciprocates the connecting rod 42, and thereby rocks the rock lever 31, by which the connecting rod 38, is reciprocated, thereby imparting an oscillating movement to the arm 28, on the shaft 26, which causes the pawl 29, to impart an intermittent rotary movement to the ratchet wheel 30, on the hollow shaft 12, by which the drum 11, is intermittently rotated, and consequently the belts 15, 15A and 15B, which are operated by the said drum.

Upon the upper edges of the side bars 1, are secured guides 60, in which are mounted slide bars 61, which are connected at their forward ends by links 62, with the upper ends of the oscillating arms 27 and 28, respectively. The rear portions of these slide bars are provided with upwardly extending ears 63, to which are pivotally secured the forward ends of short bars 64, the opposite ends of which are provided with depending fixed pawls 65, which are adapted to engage ratchet teeth 66, which are formed in the upper edges of bars 67, which extend beyond the end of the frame 3.

The bars 67, extend slidably through guides 68, on the rear ends of the side bars 1, and their forward ends are T-shaped and extend into housings 69, which are also secured upon the upper edges of the side bars 1. The closed ends of these housings are provided with threaded apertures which receive adjustment screws 70, the ends of which bear against metal blocks 71, against which are placed rubber abutment blocks 72, which cushion the return or forward strokes of the bars 67, as will be hereinafter more fully explained.

By means of the adjustment screws 70, the bars 67, can be adjusted so that the pawls 65, will simultaneously engage corresponding teeth in the bars 67, and thus both bars be engaged and moved at the same instant.

Upon the rear end of each bar 67, is secured a depending bracket 73, and to these brackets is secured a horizontal metal plate 74, which normally lies beneath and close to the forward end of the table 10, a sufficient space being left between them to admit of the free movement of the conveyers. This plate is stepped to correspond to the stepped end of the table, as shown in Fig. 14. The pivoted bars 64, are provided with vertically disposed pawls 75, which, as the bars 61, are moved forward by the lever arms 27 and 28, ride over ratchet toothed bars 76, which are secured to the upper edges of the side bars 1, and at the same time the fixed pawls 65, on the ends of the hinged bars 64, each engage a tooth 66 of the bars 67, and move the said bars with the plate 74, forward above and close to an endless conveyer 77, which is at right angles to the conveyers 15, 15A and 15B, and is carried by a drum 78, at its rear end, and by a small roller or shaft 79, at its forward end, which drum and shaft are mounted in the frame 3A, the shaft or roller 79, being mounted in slidable bearing blocks 80, which are mounted in slideways 81, the blocks being provided with hand screws 82, by which they may be adjusted to give the required tension to the conveyer.

An angle bar 83, is secured along the forward edge of the plate 74, and to each end of this angle bar is secured one end of a suitable flexible connection, such as a chain or cord 84, which extend forward over sheave wheels 85, and have weights 86, secured to their opposite ends, which exert a continuous forward pull on the plate 74.

When the plate 74 is moved forward by the engagement of the pawl 65, with the teeth 66, of the bars 67, the weights 86, are raised, and the pawls 75, slide over the teeth 76, which are oppositely set from the teeth 66, but the instant the bars 61, begin their return stroke through their connection with the oscillating arms 27 and 28, the pawls 75, engage the toothed bars 76, by which engagement they are drawn from inclined to vertical positions, and thereby lift the hinged arms 64, by which the fixed pawls 65, at the ends of the said arms 64, are disengaged from the teeth 66, of the bars 67, when the said bars are instantly and quickly retracted by the weights 86, and thus the plate 74, is restored to its position immediately beneath the forward end of the table 10. The pawls 75, are prevented from swinging beyond vertical positions in one direction, by stops X.

The shock of the return stroke of the arms 67, is received by the rubber abutment blocks 72, in the housings 69, as hereinbefore described.

The function of the plate 74, and reason for the quick return movement of the same, will be explained hereinafter.

The operating drum 78, of the conveyer 77, is mounted on a shaft 87, supported in bearings on the adjacent end of the frame 3$^A$, and this shaft 87, carries a bevel gear 88, which meshes with and is driven by the bevel gear 47, on the shaft 44. Thus while the main conveyer is given an intermittent rotary movement by the oscillating arm 28, and its pawl 29, which engages the ratchet wheel 30, on the drum shaft 12, the conveyer 77, is given a continuous rotary movement through the continuously rotating shaft 44.

From the foregoing, it will be seen that cakes, crackers or other articles which are deposited upon the main conveyers, are discharged therefrom upon the quick return plate 74, which is moved out from under the forward end of the conveyer to receive them, and as the plate is quickly retracted, the articles deposited thereon are dropped in a line upon the conveyer 77, and not in a straggling and irregular manner, as would be the case if they were discharged from the main conveyer directly upon the conveyer 77, because in this case the articles would fall in irregular quantities upon a moving conveyer, and would be in like manner discharged from the same, whereas by the employment of the receiving plate 74, a quantity of articles will accumulate upon the plate while the same is moving forward, and this quantity is dropped upon the conveyer 77, at one time, and in even line, by the quick withdrawal of the said plate 74.

The shaft 87, carries a sprocket wheel 98, which is connected by a chain 99, with a sprocket wheel 100, on a shaft 101, which is mounted in bearings bolted to the front legs or uprights of the frame 3$^A$. This shaft carries a cone pulley 102, which is connected by a belt 103, with a cone pulley 104, which is mounted at the opposite end of the frame. The shaft of the cone pulley 104, is provided with a stepped sprocket wheel 105, by which power is transmitted to a third conveyer frame, which forms no part of the present invention.

Above the table, and about midway of its length, is mounted a revolving drum 106, which I term a cake separator, as it is adapted to separate overlapping cakes which are moved forward on the conveyers after being discharged thereon from the baking pans.

This cake separating drum comprises two opposite circular head plates 107, which are secured upon the ends of a circular series of bars 108, which are preferably spaced as shown in Fig. 8.

The heads 107, of this cake separating drum are mounted on and secured to a shaft 109, which extends over and across the top of the table at right angles to its length and is journaled in boxes 110 that are mounted in slideways in standards 111, that are secured to the side bars 1, of the main frame.

Upon one end of the shaft 109, is secured a ratchet wheel 112, the teeth of which are engaged by a pawl 113, that is pivoted to a lever 114, that is mounted loosely on the shaft 109, at one end, and to one end of a connecting rod 115, at its opposite end. The opposite end of this connecting rod is pivotally secured to the upper end of a vertically projecting arm 116, the lower end of which is secured to the adjacent reciprocating side rod 61, by which a reciprocating movement is imparted to the lever 114, through the medium of the connecting rod 115, and the pawl is thus actuated and engages the ratchet teeth by gravity and intermittently imparts a short rotative movement to the ratchet wheel, and consequently to the shaft 109 and the drum 106.

The bars 108, of the cake separating drum support rows of pins 117, which are slidably mounted in apertures 118, formed radially through the bars, and the pins depend radially from the bars close to the top of belts 15, 15$^A$ and 15$^B$, that rest on and travel over the top of the table 10. The pins are prevented from falling out of the slots by heads 119, which also are of sufficient weight to cause the pins to drop by gravity as the drum rotates, as will be understood by reference to Fig. 8. As the drum rotates, the pins, when they approach the central upper portion of the drum, drop back by gravity through their apertures in the bars against the shaft 109. I preferably use hat pins of equal length, and the drum is mounted so that it can be vertically raised or lowered to bring the points of the pins close enough to the tops of the belts to clear the tops of the forwardly moving cakes that are not overlapped by other cakes, but not high enough to pass over a cake that is lying on top of another; consequently when the top cake is moved against one or two of the pins by the belt on which it rests, it is pushed off the under cake and onto the belt, and is thus moved along to the discharge end of the belt.

I have preferably illustrated the cake separating pins in only each alternate bar around the drum, although pin receiving apertures are formed through all of the bars. I do this because cakes vary in diameter and some do not require as many pins to separate them as others.

I also preferably arrange the pins in straight rows along each bar, and the pins may be placed only in each alternate pin hole, which arrangement provides a sufficient number of pins for some sizes of cakes. I preferably, however, position the pins in staggered relation to each other in their circumferential arrangement around the drum.

My invention contemplates any means for adjustably raising or lowering the pin-carrying drum. I preferably, however, carry out this feature of my invention in the following manner:

The upper ends of the standards are provided with apertures, through which threaded rods 120, extend down to and through threaded holes in the journal boxes 110, of the drum shaft, and bevel gears 121, are secured to the upper ends of these threaded rods 120, and rest on the top of the standards 111.

Uprights having bearings 122, are formed on the tops of the standards 111, and a shaft 123, extends across the table above the pin drum and is journaled in these bearings 122. Bevel gears 124, are secured on the opposite ends of this shaft in mesh with the bevel gears 121.

The shaft 123, projects beyond the bearing 122, on one side of the frame, and a handle wheel 125, is secured to its end, and when this wheel is turned, the gears 124 rotate the gears 121, and the threaded rods 120 raise or lower the pin drum relative to the surface of the belts and of the table. Consequently the height of the pins 117 can be adjusted to just clear cakes of any thickness that lie flat on the belts and to dislodge any cakes that are resting on others and cause them to be moved by the traveling movement of the belt, until they also lie flat on the top of the belts.

In my above mentioned patent I employ a single endless intermittent belt, which extends entirely across the top of the table, but I found, in the practical operation of my machine, that as the cakes were discharged from the baking pans onto the head end of the table, they would not always distribute themselves equally over the width of the table, and that there would sometimes be too many cakes in the central portion of the table; and in my present invention I have provided means for dividing the cakes so that they may be more equally distributed throughout the width of the table, and while my invention contemplates any means for distributing the cakes throughout the width of the table, I preferably carry out this feature of my invention in the following manner:

I divide the table into three lengthwise sections, all of the same width, the divisions being formed by the vertical flange of two T-bars, which extend the whole length of the table, and the lower flanges of these T-bars are set into recesses in the adjacent bottom edges of the table members, which rest upon the said bottom flanges of the T-bars.

The vertical flanges of the T-bars project slightly above the top of the sections of the table, and the three endless variable stroke intermittently moving belts which move from the cake receiving end of the table to its discharge end, are placed between these T-bar flanges and between them and the inner sides of the angle bars 4, which are secured to the side bars 1, of the table.

To the inside surface of the vertical flanges of the T-bars I secure angle plates 126, to the side of which that faces the head end of the table, are pivotally secured one end of a pair of cake dividing fingers 127, the terminal ends of which are tapered from their edges that face the flanges. To each finger 127, is pivotally secured one end of a bar 128, the other end portion of which is formed with a longitudinal slot 129. The slotted end portion of each bar rests upon the opposite angle plate 126, and is secured thereto by a thumb screw 130, which passes through the slot and into the angle plate. When the thumb screws are turned to unclamp the bars, the fingers 127 may be moved inward toward each other, or outward away from each other, and then clamped in the desired positions by the thumb screws 130. The cake dividing fingers 127, are adjusted to divide and separate the cakes moved against them by the belts to direct them from the central section of the table and from the central belt to the two side belts and sections of the table, which they accomplish in the following manner:

The flanges of the T-bars extend above the sections of the table and belts throughout the entire length of the table, but the surface of the table is raised to the level of the tops of the flanges, from a few inches in front of the ends of the cake dividers to a short distaince beyond them, the raised portion being inclined at each end to the surface of the table. Consequently the fingers can be moved and adjusted to divide and separate and direct the cakes from the center section of the belt and table as desired. These cake dividers receive the cakes a few inches below the cake separating pin drum.

This raised portion is produced by a short thin board 131, which is secured to the middle table section beneath the drum 106, the ends of this board being inclined from the surface of the table, as clearly shown in Fig. 9.

The discharge end of the table is divided off into three cake discharging step portions 132, 133 and 134, one for each belt and table section. The belt section 15$^B$ along the front side of the machine is stepped off shorter than the other two sections, the middle section being a little longer, and the opposite side sections the longest, and the center section projects far enough beyond the front side section and the rear side far enough beyond the central section to allow ample discharging space onto the endless belt 77, that is the same as is used in my above named patent, but is made enough wider to allow all of the three belts to discharge the cakes upon it.

This endless belt that recevies the cakes from the three belts is mounted as shown in my former patent, and it receives the cakes from the three sectional belts and discharges them into a series of cake stacking spouts 135, that are attached to the table 3$^A$, but which I do not fully illustrate or describe, as they form the subject matter of another application for a patent, filed August 30, 1920, No. 406930 for adjustable cookie and cake stacking chutes.

The cakes, as they drop from the ends of the sectional belts, drop onto the receiving and quick returning plate 74, that receives them from the ends of the sectional belts, and by its quick return movement draws out from under them and allows them to drop onto the surface of the continuously running belt.

In order to guide or direct the cakes as they are carried along the belt 77, in order that they may enter the said spouts 135, in line with the axes of said spouts, I provide the corners of the ends of each of the sectional belts with a centralizing finger 136, which is pivotally secured to an angle plate 137, two of which are attached to the end portions of the T-bars, while the remaining one is secured upon the adjacent side bars of the frame 3$^A$.

The horizontal flange of each angle plate 137, is slotted and a bolt is passed through the slot and through one end of a bar 138, the other end of which is pivotally secured to the guide 136. A thumb nut 139, is screwed on the bolt, and after the guide is swung to the desired angle, the thumb nut is turned to clamp the adjacent end of the bar 138, to the angle plate 137, and thus hold the guide at the desired angle.

In order to separate any cakes that may lodge on or overlap others as they drop from the quick return plate onto the continuously running belt, I place over the discharge end portion of this belt a cake separating pin supporting bar 140, which is constructed in the same manner as any one of the bars 108, of the drum 106, and is arranged to be raised above or lowered toward the surface of the belt 77, to separate overlapping cakes of any thickness.

This cake separating pin device comprises a cross-bar that is supported in guide blocks 146, on the side rails 141, of the frame 3$^A$ and the pins 142, extend down through the cross-bar with their heads resting on top of the bar. A strap 143, is secured to and is extended across, and a suitable distance above the top of the bar 140, and is arranged to limit the upward movement of the pins.

The ends of the bar 140, are supported upon thumb screws 144, which pass through the said ends and also through threaded holes in metal plates 145, in the ends of the bar, their ends bearing against the bottoms of recesses in the guide blocks 146, in which the ends of the bar 140 lie, and by turning the thumb screws 144, the bar is raised or lowered to properly position the pins 142, with respect to the conveyer 77.

My present invention provides a perfected cake receiving, separating, dividing and centralizing and again separating machine, that forms the first part or section of the machine patented to me in the Letters Patent herein mentioned, the other two parts or sections of which are simply outlined, as the last section has also been perfected and made the subject of a separate application for a patent, which was filed on August 30, 1920, No. 406,929.

The operation of my cake receiving, separating, dividing and centralizing machine is as follows:

The machine is started and the required speed and throw movement of the parts determined. The baked cakes or other articles are then deposited upon the forward end of the main conveyer in the manner before described, and they are carried forward by intermittent steps until they discharge upon the quick return receiving plate, which is moved forward from beneath the discharge end of the main conveyer, by the engagement of the pawl on the ends of the hinged bars 64, with the toothed portions of the bars 67, which support the said quick return plate. When the reciprocating bars 61, start on their return movement through their engagement with the oscillating arms 27 and 28, the pawls 75, engage the rack bars 76, as before described, and lift the pawls 65, out of engagement with the teeth of the bars 67, which are then quickly retracted by the weights 86, which are connected by flexible connections with the said quick return plate. This quick retraction of the plate 74, causes the cakes thereon to be deposited upon the continuously moving conveyer 77, in alined form, whence they slide into the adjustable-choke stacking chutes.

Having described my invention, what I claim as new and desire to secure by Letters Patent, is:

1. In a cake separating and dividing machine, the combination of the frame and the table mounted thereon, with a plurality of cake carrying, endless belt conveyers, arranged to run close to and over the surface of said table; projecting ribs on said table between said belt conveyers; and means for rotating said endless belt conveyer.

2. In a cake separating and dividing machine, the combination of the frame and the table mounted thereon, with a plurality of cake carrying, endless belt conveyers, arranged to run close to and over the surface of said table; projecting ribs on said table between said belt conveyers; and means for rotating said endless belt conveyer; a drum for supporting the receiving end of said conveyers; said table being arranged at its discharge end to support the discharge ends of said conveyers; and means for rotating said conveyers in unison with each other.

3. In a cake separating and dividing machine, the combination of the frame and the table mounted thereon, with a plurality of cake carrying, endless belt conveyers, arranged to run close to and over the surface of said table; projecting ribs on said table between said belt conveyers; and means for rotating said endless belt conveyer; a drum for supporting the receiving end of said conveyers; said table being arranged at its discharge end to support the discharge ends of said conveyers; and means for rotating said conveyers in unison with each other; said table being formed at its discharge end into the same number of discharging step portions as there are belt conveyers on said table; said step portions being progressively longer from the discharging side of the machine to its opposite side; said belt conveyers being arranged on said table so that the discharge end of each belt will run over the end of one of the steps.

4. In a cake separating and dividing machine, the combination of the frame and the table mounted thereon, with a plurality of cake carrying, endless belt conveyers, arranged to run close to and over the surface of said table; projecting ribs on said table between said belt conveyers; and means for rotating said endless belt conveyer; a drum for supporting the receiving end of said conveyers; said table being arranged at its discharge end to support the discharge ends of said conveyers; and means for rotating said conveyers in unison with each other; said table being formed at its discharge end into the same number of discharging step portions as there are belt conveyers on said table; said step portions being progressively longer from the discharging side of the machine to its opposite side; said belt conveyers being arranged on said table so that the discharge end of each belt will run over the end of one of the steps; and a cake receiving and discharging endless conveyer positioned at right angles to said table and its plurality of conveyers and arranged under the cake discharging step end portions of said table and of said plurality of conveyers; and adapted to receive the cakes from said table conveyers and to discharge them from said cake separating and dividing machine.

5. In a cake separating and dividing machine, the combination of the frame and the table mounted thereon, with a plurality of cake carrying, endless belt conveyers, arranged to run close to and over the surface of said table; projecting ribs on said table between said belt conveyers; and means for rotating said endless belt conveyer; a drum for supporting the receiving end of said conveyer; said table being arranged at its discharge end to support the discharge ends of said conveyers; and means for rotating said conveyers in unison with each other; said table being formed at its discharge end into the same number of discharging step portions as there are belt conveyers on said table; said step portions being progressively longer from the discharging side of the machine to its opposite side; said belt conveyers being arranged on said table so that the discharge end of each belt will run over the end of one of the steps; and a cake receiving and discharging endless conveyer positioned at right angles to said table and its plurality of conveyers and arranged under the cake discharging step end portions of said table and of said plurality of conveyers; and adapted to receive the cakes from said table conveyers and to discharge them from said cake separating and dividing machine; and adjustably swinging cake dividing members secured to the conveyer dividing ribs of said table.

6. In a cake separating and dividing machine, the combination of the frame and the table mounted thereon, with a plurality of cake carrying, endless belt conveyers, arranged to run close to and over the surface of said table; projecting ribs on said table between said belt conveyers; and means for rotating said endless belt conveyer; a drum for supporting the receiving end of said conveyers; said table being arranged at its discharge end to support the discharge ends of said conveyers; and means for rotating said conveyers in unison with each other; said table being formed at its discharge end into the same number of discharging step portions as there are belt conveyers on said table; said step portions being progressively longer from the discharging side of the machine to its opposite side; said belt conveyers being arranged on said table so that the discharge end of each belt will run over the end of one of the steps; and a cake receiving and discharging endless conveyer positioned at right angles to said table and its plurality of conveyers and arranged under the cake discharging step end portions of said table and of said plurality of conveyers; and adapted to receive the cakes from said table conveyers and to discharge them from said cake separating and dividing machine; and adjustably swinging cake dividing members secured to the conveyer dividing ribs of said table; and a cake separating device secured to said table at its cake receiving end; comprising a vertically adjustable drum extending across said table and a plurality of pins depending from said drum and arranged to be engaged by cakes resting on other cakes.

7. In a cake separating and dividing machine, the combination of the frame and the table mounted thereon, with a plurality of cake carrying, endless belt conveyers, arranged to run close to and over the surface of said table; projecting ribs on said table between said belt conveyers; and means for rotating said endless belt conveyer; a drum for supporting the receiving end of said conveyers; said table being arranged at its discharge end to support the discharge ends of said conveyers; and means for rotating said conveyers in unison with each other; said table being formed at its discharge end into the same number of discharging step portions as there are belt conveyers on said table; said step portions being progressively longer from the discharging side of the machine to its opposite side; said belt conveyers being arranged on said table so that the discharge end of each belt will run over the end of one of the steps; and a cake receiving and discharging endless conveyer positioned at right angles to said table and its plurality of conveyers and arranged under the cake discharging step end portions of said table and of said plurality of conveyers; and adapted to receive the cakes from said table conveyers and to discharge them from said cake separating and dividing machine; and adjustably swinging cake dividing members secured to the conveyer dividing ribs of said table; and a cake separating device secured to said table at its cake receiving end; comprising a vertically adjustable drum extending across said table and a plurality of pins depending from said drum and arranged to be engaged by cakes resting on other cakes; and means including a ratchet wheel and pawl mechanism for imparting a step by step rotative movement to said cake separating pin drum.

8. In a cake separating and dividing machine, the combination of the frame and the table mounted thereon, with a plurality of cake carrying, endless belt conveyers, arranged to run close to and over the surface of said table; projecting ribs on said table between said belt conveyers; and means for rotating said endless belt conveyer; a drum for supporting the receiving end of said conveyers; said table being arranged at its discharge end to support the discharge ends of said conveyers; and means for rotating said conveyers in unison with each other; said table being formed at its discharge end into the same number of discharging step portions as there are belt conveyers on said table; said step portions being progressively longer from the discharging side of the machine to its opposite side; said belt conveyers being arranged on said table so that the discharge end of each belt will run over the end of one of the steps; and a cake receiving and discharging endless conveyer positioned at right angles to said table and its plurality of conveyers and arranged under the cake discharging step end portions of said table and of said plurality of conveyers; and adapted to receive the cakes from said table conveyers and to discharge them from said cake separating and dividing machine; and adjustably swinging cake dividing members secured to the conveyer dividing ribs of said table; and a cake separating device secured to said table at its cake receiving end; comprising a vertically adjustable drum extending across said table and a plurality of pins depending from said drum and arranged to be engaged by cakes resting on other cakes; and means including a ratchet wheel and pawl mechanism for imparting a step by step rotative movement to said cake separating pin drum; said drum being mounted on a shaft, and said pins being arranged loosely in rows in said drum and to fall by gravity back into said drum as they pass the upper central portion of said drum until their inner ends bear against said drum shaft and to fall out into the path of said cakes when said drum passes its lower central portion just above the thickness of a cake above the surface of said belt conveyers.

9. In a cake separating and dividing machine, the combination of the frame and the table mounted thereon, with a plurality of cake carrying, endless belt conveyers arranged to run close to and over the surface of said table; projecting ribs on said table between said belt conveyers; and means for rotating said endless belt conveyer; a drum for supporting the receiving end of said conveyers; said table being arranged at its discharge end to support the discharge ends of said conveyer; and means for rotating said conveyers in unison with each other; said table being formed at its discharge end into the same number of discharging step portions as there are belt conveyers on said table; said step portions being progressively longer from the discharging side of the machine to its opposite side; said belt conveyers being arranged on said table so that the discharge end of each belt will run over the end of one of the steps; and a cake receiving and discharging endless conveyer positioned at right angles to said table and its plurality of conveyers and arranged under the cake discharging step end portions of said table and of said plurality of conveyers; and adapted to receive the cakes from said table conveyers and to discharge them from said cake separating and dividing machine; and adjustably swinging cake dividing members secured to the conveyer dividing ribs of said table; and a cake separating device secured to said table at its cake receiving end; comprising a vertically adjustable drum extending across said table and a plurality of pins depending from said drum and arranged to be engaged by cakes resting on other cakes; means including a ratchet wheel and pawl mechanism for imparting a step by step rotative movement to said cake separating pin drum, said drum being mounted on a shaft, and said pins being arranged loosely in rows in said drum and to fall by gravity back into said drum as they pass the upper central portion of said drum until their inner ends bear against said drum shaft, and to fall out into the path of said cakes when said drum passes its lower central portion just above the thickness of a cake above the surface of said belt conveyers, an adjustable swinging centralizing finger secured to the corner of each step portion of said table, arranged and adapted to centralize said cakes on said cake discharging belt conveyer as they are discharged from said plurality of cake carrying belts.

10. In a cake separating and dividing machine, the combination of the frame and the table mounted thereon, with a plurality of cake carrying, endless belt conveyers arranged to run close to and over the surface of said table; projecting ribs on said table between said belt conveyers; and means for rotating said endless belt conveyer; a drum for supporting the receiving end of said conveyers; said table being arranged at its discharge end to support the discharge ends of said conveyer; and means for rotating said conveyers in unison with each other; said table being formed at its discharge end into the same number of discharging step portions as there are belt conveyers on said table; said step portions being progressively longer from the discharging side of the machine to its opposite side; said belt conveyers being arranged on said table so that the discharge end of each belt will run over the end of one of the steps, and a cake receiving and discharging endless conveyer positioned at right angles to said table and its plurality of conveyers and arranged under the cake discharging step end portions of said table and of said plurality of conveyers, and adapted to receive the cakes from said table conveyers and to discharge them from said cake separating and dividing machine; and adjustably swinging cake dividing members secured to the conveyer dividing ribs of said table; and a cake separating device secured to said table at its cake receiving end; comprising a vertically adjustable drum extending across said table and a plurality of pins depending from said drum and arranged to be engaged by cakes resting on other cakes; means including a ratchet wheel and pawl mechanism for imparting a step by step rotative movement to said cake separating pin drum, said drum being mounted on a shaft, and said pins being arranged loosely in rows in said drum and to fall by gravity back into said drum as they pass the upper central portion of said drum until their inner ends bear against said drum shaft, and to fall out into the path of said cakes when said drum passes its lower central portion just above the thickness of a cake above the surface of said belt conveyers, an adjustable swinging centralizing finger secured to the corner of each step portion of said table, arranged and adapted to centralize said cakes on said cake discharging belt conveyer as they are discharged from said plurality of cake carrying belts, and a vertical adjustable row of cake separating pins positioned across said endless cake discharging conveyer below said cake centralizing fingers.

11. In a cake separating and dividing machine, the combination of the frame and the table mounted thereon with a plurality of cake carrying, endless belt conveyers arranged to run close to and over the surface of said table; projecting ribs on said table between said belt conveyers; and means for rotating said endless belt conveyer; a drum for supporting the receiving end of said conveyers; said table being arranged at its discharge end to support the discharge ends of said conveyer; and means for rotating said conveyers in unison with each other; said table being formed at its discharge end into the same number of discharging step portions as there are belt conveyers on said table; said step portions being progressively longer from the discharging side of the machine to its opposite side; said belt conveyers being arranged on said table so that the discharge end of each belt will run over the end of one of the steps, and a cake receiving and discharging endless conveyer positioned at right angles to said table and its plurality of conveyers and arranged under the cake discharging step end portions of said table end of said plurality of conveyers, and adapted to receive the cakes from said table conveyers and to discharge them from said cake separating and dividing machine; and adjustably swinging cake dividing members secured to the conveyer dividing ribs of said table; and a cake separating device secured to said table at its cake receiving end; comprising a vertically adjustable drum extending across said table and a plurality of pins depending from said drum and arranged to be engaged by cakes resting on other cakes; means including a ratchet wheel and pawl mechanism for imparting a step by step rotative movement to said cake separating pin drum, said drum being mounted on a shaft, and said pins being arranged loosely in rows in said drum and to fall by gravity back into said drum as they pass the upper central portion of said drum until their inner ends bear against said drum shaft, and to fall out into the path of said cakes when said drum passes its lower central portion just above the thickness of a cake above the surface of said belt conveyers, an adjustable swinging centralizing finger secured to the corner of each step portion of said table, arranged and adapted to centralize said cakes on said cake discharging belt conveyer as they are discharged from said plurality of cake carrying belts, and a vertical adjustable row of cake separating pins positioned across said endless cake discharging conveyer below said cake centralizing fingers, and with the ribs for separating said plurality of endless belt conveyers; a raised portion in said table and the cake dividing fingers arranged to move said cakes from the raised portion over the tops of said conveyer separating ribs.

12. In a cake separating and dividing machine, the combination of the frame and the table mounted thereon, with a plurality of cake carrying, endless belt conveyers, arranged to run close to and over the surface of said table; projecting ribs on said table between said belt conveyers; and means for rotating said endless belt conveyer, and with the vertical adjustable cake separating pin mechanisms, the adjustable cake dividing and centralizing devices, the stepped ending cake discharging table and its conveyers, the conveyer for receiving the cakes from the discharging stepped ends of the table and its conveyers, and means for operating these coöperating features in the successive order of their operative functions, whereby cakes are separated, divided, centralized, again separated, and then discharged from the machine.

13. In a machine of the character described, the combination with endless conveyers which terminate in stepped order at their discharge ends, means for moving them in unison, a stepped receiving plate under the discharge ends of said conveyers, reciprocating means for moving said plate forward, and means for quickly retracting said plate; of rotatable means mounted above said conveyers, gravity elements carried by said rotating means for separating overlapping cakes carried forward on said conveyers, and a pawl and ratchet mechanism operated by said reciprocating means for actuating said rotatable means.

14. In a machine of the character described, the combination with an endless conveyer, a receiving plate under the discharge end of said conveyer, reciprocating means for moving said plate beyond the discharge end of the conveyer, and means for quickly retracting said plate to dislodge the cakes thereon; of a rotatable element supported above said conveyer, gravity pins carried by said rotatable element for separating overlapping cakes carried forward on said conveyer, a pawl and ratchet mechanism actuated by the reciprocating mechanism, for turning said rotatable means, and means for operating the reciprocating mechanism.

15. In a device of the character described, the combination with an endless conveyer, a receiving plate under the discharge end thereof, reciprocating means for moving said plate beyond the end of the conveyer and means for quickly retracting the plate; of a rotatable drum, and bearings for supporting the same above the conveyer, means for adjusting said bearings in unison to raise or lower said drum, gravity pins in said drum for separating overlapping cakes carried forward on said conveyer, and a pawl and ratchet mechanism operated by said reciprocating means, for turning said drum.

16. In a device of the character described, the combination with an endless conveyer, a receiving plate under the discharge end of said conveyer, reciprocating means for moving said plate beyond the said discharge end of the conveyer, and means for quickly retracting the plate; of a rotatable drum comprising a circular series of spaced bars, gravity pins slidably mounted in said bars for separating overlapping cakes moved forward by the conveyer, bearings for supporting said drum above said conveyer, gearing for adjusting said bearings in unison, to raise or lower said drum, and pawl and ratchet mechanism operated by said reciprocating means for turning said drum.

17. A drum for the purpose specified, comprising a circular series of spaced bars and head plates secured upon the ends of said bars, spaced gravity pins slidably mounted in each bar, and an axial shaft in said drum.

18. In a device of the character described, the combination with an endless conveyer comprising three separated belts which move in unison, of means supported above the central belt for diverting portions of material carried thereon to the other belts.

19. In a device of the character described, the combination with an endless conveyer comprising three separated belts which move in unison, of adjustable members secured above the middle belt for diverting portions of material carried thereon to the other belts.

20. In a device of the character described, the combination with an endless conveyer comprising separated belts which move in unison, of hinged arms supported above the side edges of the middle belt, having beveled forward ends and means for adjusting said arms toward each other over the belt, whereby portions of material carried by the middle belt, are diverted by said arms to the other belts.

21. In a device of the character described, the combination with an endless conveyer comprising three belts which move in unison, and raised strips for separating said belts, of supports secured to said strips, arms hinged to said supports having beveled forward ends, cross-bars pivotally connected to said arms at one end, their opposite end portions being adjustably connected, respectively, with the opposite supports, said arms adapted to lie at an acute angle to the edges of the middle belt, and over the same, whereby portions of material carried by the middle belt are diverted to the side belts.

22. In a device of the character described, the combination with an endless conveyer comprising three separated belts which move in unison, and terminate at their discharge ends in stepped order, a stepped receiving plate under and adjacent the discharge ends of the conveyer, operating means for imparting an intermittent movement to said conveyer, reciprocating means connected with the operating means for moving the receiving plate beyond the end of the conveyer; and means for quickly retracting the plate to dislodge the goods thereon; of an endless conveyer for receiving said goods, and means at the discharge end of each belt of the first conveyer for alining the goods deposited on the second conveyer.

In testimony whereof I affix my signature in presence of two witnesses.

PETER RASMUSSEN.

Witnesses:
G. SARGENT ELLIOTT,
AMY E. NACE.